(12) United States Patent
Lischka

(10) Patent No.: US 8,933,647 B2
(45) Date of Patent: Jan. 13, 2015

(54) LED CONTROLLER WITH CURRENT-RIPPLE CONTROL

(75) Inventor: Georg Lischka, Poing (DE)

(73) Assignee: Infineon Technologies AG, Neubiberg (DE)

( * ) Notice: Subject to any disclaimer, the term of this patent is extended or adjusted under 35 U.S.C. 154(b) by 216 days.

(21) Appl. No.: 13/560,909

(22) Filed: Jul. 27, 2012

(65) Prior Publication Data

US 2014/0028205 A1 Jan. 30, 2014

(51) Int. Cl.
H05B 37/02 (2006.01)

(52) U.S. Cl.
USPC ........................... 315/307; 315/193; 315/297

(58) Field of Classification Search
USPC ............. 315/185 R, 186, 192, 193, 224, 291, 315/397, 307, 308, 360, 297
See application file for complete search history.

(56) References Cited

U.S. PATENT DOCUMENTS

| | | | | |
|---|---|---|---|---|
| 6,057,651 | A * | 5/2000 | Usami | 315/291 |
| 8,258,719 | B2 * | 9/2012 | Hoogzaad | 315/291 |
| 8,680,781 | B1 * | 3/2014 | Pflaum | 315/291 |
| 2004/0155602 | A1 | 8/2004 | Buij et al. | |
| 2007/0013323 | A1 * | 1/2007 | De Oto | 315/291 |
| 2009/0015178 | A1 | 1/2009 | Liu | |
| 2010/0244801 | A1 * | 9/2010 | Arora et al. | 323/284 |

OTHER PUBLICATIONS

Infineon, "1200mA step down—LED controller IC; ILD4120," Target Datasheet, Rev. 1.0, Jul. 2000, 11 pages.

* cited by examiner

*Primary Examiner* — Tung X Le
(74) *Attorney, Agent, or Firm* — Slater & Matsil, L.L.P.

(57) ABSTRACT

An LED controller and a method for controlling an LED device is disclosed. A current sense signal is representative of a load current flowing through the LED device. The current sense signal is compared with an upper threshold value and a lower threshold value. Current is provided to the LED device via an inductor coupled in series with the LED device when the current sense signal exceeds the upper threshold. A load current loop is closed over a free-wheeling diode when no current is provided to the LED device while the current sense signal is below the lower threshold. The upper threshold and the lower threshold are adjusted dependent on the current sense signal such that peak values of the current sense signal match corresponding desired peak values.

22 Claims, 3 Drawing Sheets

US 8,933,647 B2

LED CONTROLLER WITH CURRENT-RIPPLE CONTROL

TECHNICAL FIELD

The invention relates to a control circuit for driving LED devices including one or more LEDs (light emitting diodes) for illumination purposes.

BACKGROUND

Unlike conventional illuminants, such as incandescent light bulbs, light emitting diodes are usually supplied with a constant operating current rather than a constant operating voltage. Therefore controllable current source circuits are usually employed for driving LED devices, and switching converters are used to keep power losses due to the current conversion low. Various integrated LED controller circuits including, e.g., a buck converter for current conversion are readily available (e.g., integrated LED controller ILD4120 from Infineon).

As a matter of operating principle the LED current (i.e., the load current supplied to the LED device) will always exhibit a ripple when using a current supply including a switching converter such as a buck converter. In order to enable a (controllable) constant current supply the LED current is usually measured (e.g., using a sense resistor coupled in series to the LED device), and a current signal is fed back to the controller circuit. The (measured) current feedback signal may then be compared with respective thresholds and a switching operation may be triggered when the feedback signal reaches a threshold value. Thus, the threshold values determine the size of the current ripple which may be designed to amount, for example, ±15 percent around the average LED current.

Various losses occur in such LED controller circuits such as losses due to a finite (non-zero) on-resistance of the power transistor switching the load current, losses due to the sense resistor, and losses dissipated in the required free-wheeling diode (e.g., a Schottky diode). The actual current ripple depends on the propagation delay between the time instant when the current feedback signal reaches a threshold value and the time instant when the corresponding switching operation is accomplished by the respective power transistor. Generally, the influence of the propagation delay on the current ripple can be compensated for by appropriately setting the mentioned threshold values. However, when using such an approach the achieved compensation is only valid for one specific set-up (i.e., a specific number of LEDs, a specific inductor used in the buck converter, a specific operating voltage, etc.). For example, the threshold values may be designed such that a desired ripple current of ±15 percent around the average LED current is achieved for an operating voltage of 12V, an inductor of 68 µH, and a LED device including three white LEDs connected in series. If one of these parameters (i.e., number of LEDs, operating voltage, inductance, etc.) changes, the actual current ripple will deviate from its desired value. A smaller current ripple entails a higher switching frequency and thus higher switching losses. A higher current ripple may be undesired for different reasons (e.g., a maximum current ripple may be specified by the customer).

In view of the above there is a need for a LED controller including an improved current ripple control.

SUMMARY OF THE INVENTION

A LED controller circuit to be coupled to a LED device is described. In accordance with one example of the present invention the circuit includes a first circuit node receiving a current sense signal representative of a load current supplied to the LED device and a comparator receiving the current sense signal and configured to compare the current sense signal with an upper threshold value and a lower threshold value. A load transistor is coupled to the LED device and configured to provide the load current to the LED device in accordance with a comparator output signal provided by the comparator. A ripple control circuit is configured to adapt the upper threshold value and the lower threshold value in response to the current sense signal.

BRIEF DESCRIPTION OF THE DRAWINGS

The invention can be better understood with reference to the following drawings and descriptions. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

Figure 1:
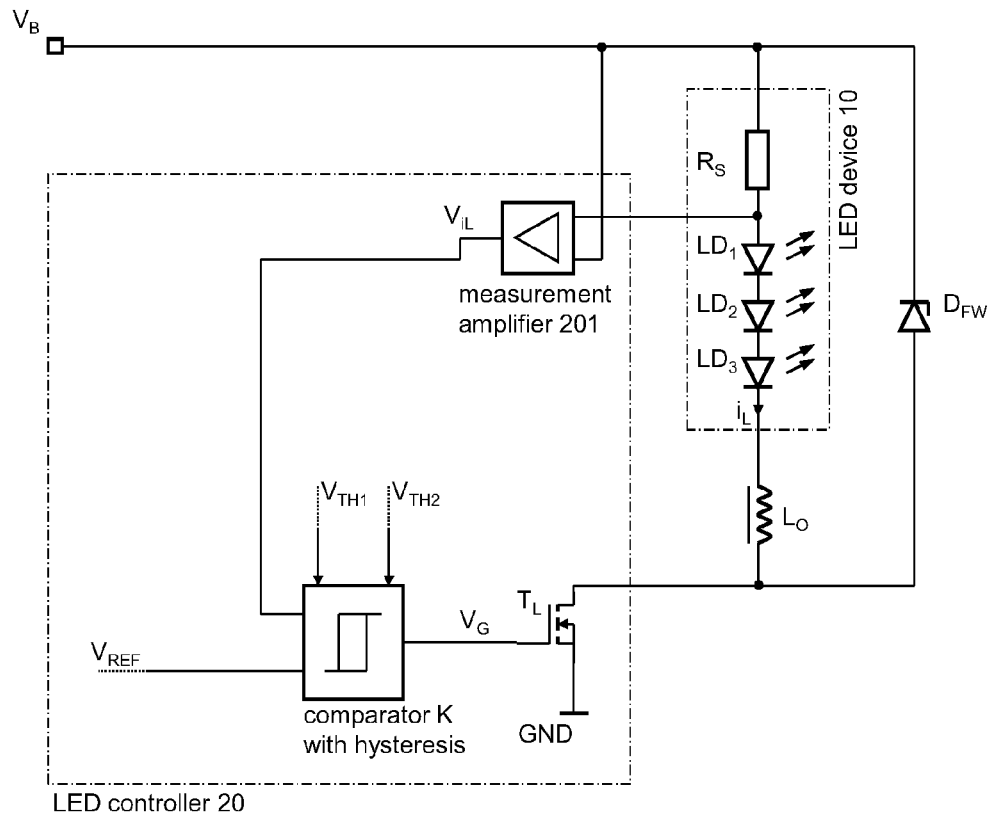
FIG. 1 is a block diagram illustrating an exemplary integrated LED controller circuit externally connected with a LED device, an inductor and a free-wheeling diode.

The FIG. 1 is a block diagram of an exemplary integrated LED controller circuit 20 which is externally connected to LED device 10, an inductor $L_O$, and a free-wheeling diode $D_{FW}$. In the present example, the LED device 10 includes a series circuit of three LEDs $LD_1$, $LD_2$, and $LD_3$, and a sense resistor $R_S$ which are connected between two main terminals, wherein the voltage drop across the sense resistor $R_S$ can be tapped at an intermediate terminal. It should by emphasized that, however, the sense resistor $R_S$ may be readily arranged as a separate component separate from the LED device 10 which may include one or more LEDs only. The inductor $L_O$ is connected in series to the LEDs $LD_1$, $LD_2$, and $LD_3$, and the free-wheeling diode is connected parallel to the series circuit of LED device 10 and inductor $L_O$.

One main terminal of the LED device 10 is coupled to an upper supply voltage $V_B$ such that the voltage drop across the sense resistor $R_S$ can be tapped between the supply line (of the supply voltage $V_B$) and the intermediate terminal of the LED device 10. The LED controller 20 includes a power transistor $T_L$ (load transistor) that is connected between the inductor and a reference potential (e.g., ground potential) such that the load current path of the transistor $T_L$ is connected in series to the LED device 10 and the inductor $L_O$.

The load current path of the transistor $T_L$ is the drain-source current path in case of a field effect transistor and the collector-emitter current path in case of a bipolar transistor. It should be noted that FIG. 1 illustrates a specific implementation of LED controller using a low-side semiconductor switch and a sense resistor at the high side. However, different configurations (e.g., high-side semiconductor switch, low-side sense resistor, second load transistor instead of free-wheeling diode, etc.) and modifications thereof may be readily applicable without departing from the general concept described herein.

A driver signal $V_G$ for driving the power transistor $T_L$ into an on-state (conducting) or an off state (non-conducting) is generated by the comparator K which is included in the LED controller circuit 20. Dependent on the application an additional gate driver circuit may be connected between the comparator K and the gate of the power transistor $T_L$ for providing a gate signal having a specific desired shape (i.e., specific rise and fall times or a specific, more complex waveform) in order to ensure a defined switching behavior.

The voltage drop across the sense resistor $R_S$ is supplied to the LED controller circuit which usually includes a measurement amplifier configured to provide a current feedback signal $V_{iL}$ proportional to the current LED current $i_L$ which flows through the LEDs $LD_1$, $LD_2$, $LD_3$, as well as through the sense resistor $R_S$ and the inductor $L_O$. The current feedback signal $V_{iL}$ is compared with two threshold values $V_{REF}+V_{TH1}$ and $V_{REF}-V_{TH2}$, respectively, or, in other words, a corresponding current offset signal $V_{OFF}=V_{iL}-V_{REF}$ is compared with the threshold values $V_{TH1}$ and $-V_{TH2}$, respectively, wherein the signal $V_{REF}$ represents the desired mean LED current. As such, the current offset signal $V_{OFF}$ represents the ripple current with zero mean. The threshold values $V_{TH1}$, $V_{TH2}$ may be chosen (during circuit design) such that the (upper and lower) peak values of the current offset signal equal a desired percentage (e.g., 15%) of the current mean LED current (represented by $V_{REF}$).

Figure 2:
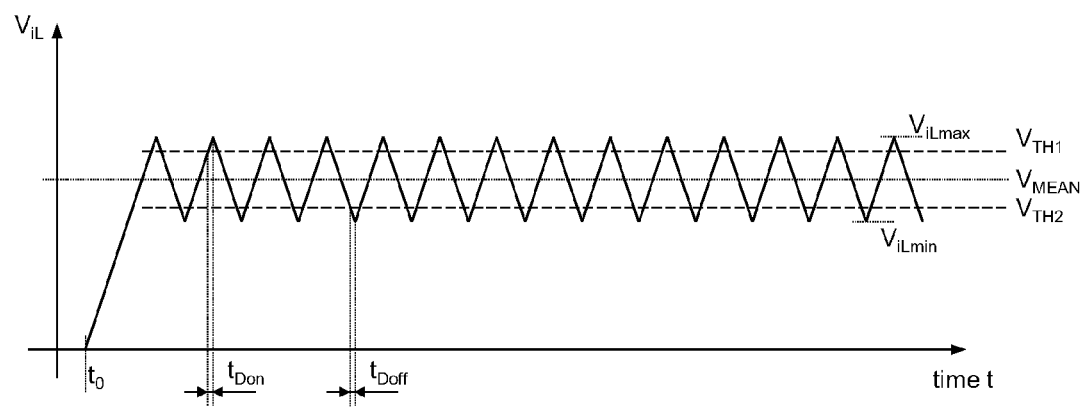
FIG. 2 is a timing diagram illustrating a waveform of the current sense signal, which represents the LED current.

The situation described above is further illustrated in the timing diagram depicted in FIG. 2. At a time $t_0$ the LED controller is activated and the load transistor $T_L$ is switched on (by generating an appropriate gate signal $V_G$) as the initial LED current (represented by the current sense signal $V_{iL}$) is zero and thus lower than the upper threshold value $V_{REF}+V_{TH1}$. The load current $i_L$, and thus the current sense signal $V_{iL}$ rises until it reaches the threshold value $V_{REF}+V_{TH1}$. At the moment when the current sense signal $V_{iL}$ equals the threshold value $V_{REF}+V_{TH1}$ the switch-off of the load transistor $T_L$ is triggered. Due to signal propagation delays the LED current flow is pinched off a delay time $t_{Don}$ later. During that delay time, the LED current further rises to a value $i_{Lmax}$ (represented by a current sense signal $V_{iLmax}$).

During the period in which the load transistor $T_L$ is switched off the LED current $i_L$ continues flowing through the free-wheeling diode $D_{FW}$. However, the LED current $i_L$ drops during this period until it the corresponding current sense signal $V_{iL}$ reaches the lower threshold value $V_{REF}-V_{TH2}$. At the moment when the current sense signal $V_{iL}$ equals the lower threshold value $V_{REF}-V_{TH2}$ the switch-on of the load transistor $T_L$ is triggered. Due to signal propagation delays the LED current flow starts a delay time $t_{Doff}$ later. During that delay time, the LED current further drops to a value $i_{Lmin}$ (represented by a current sense signal $V_{iLmin}$). As already mentioned above, the propagation delays $t_{Don}$, $t_{Doff}$ are known for a specific set-up and thus the threshold values $V_{TH1}$, $-V_{TH2}$ can be designed such that the corresponding peak values $V_{iLmax}$, $V_{iLmin}$ meet the required specification (e.g., $V_{REF}\pm 15\%$). However, this specification is only met for one specific set up, e.g., one specific operating voltage $V_B$ which entails some problems already mentioned above.

Figure 3:
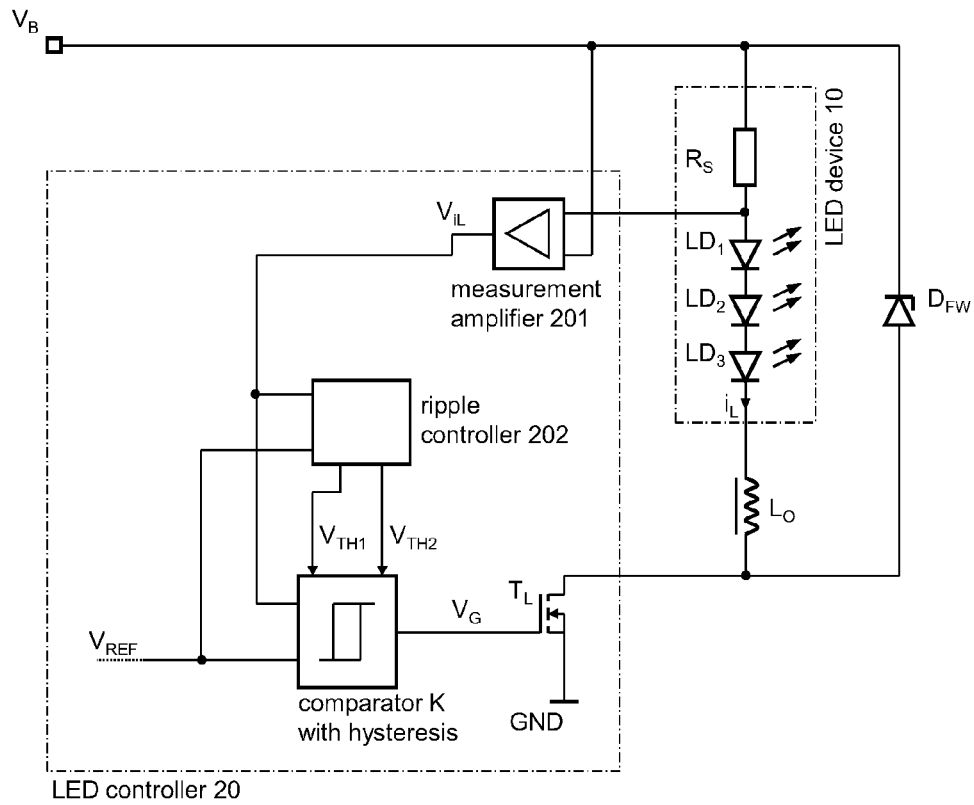
FIG. 3 is a block diagram of an integrated LED controller including a ripple control loop.

To alleviate those problems or to make the LED current peak values $V_{iLmax}$, $V_{iLmin}$ meet more independent from the actual set-up in which the LED controller 20 is used, the peak values $V_{iLmax}$, $V_{iLmin}$ (i.e., the amplitude of the ripple current) may be regulated using a further feedback loop, referred to as "ripple control" in the example of FIG. 3.

The example of FIG. 3 is essentially the same as the circuit of FIG. 1 except that the threshold values are adjustable using a ripple controller 202. The ripple controller receives the current sense signal $V_{iL}$ as well as the desired mean current (reference current $V_{REF}$) and is configured to adjust the threshold values $V_{TH1}$ and $V_{TH2}$ such that the actual peak values of the LED current $V_{iLmax}$, $V_{iLmin}$ match desired target values (e.g., the mean current plus/minus 15 percent). When the ripple controller 202 measures or estimates peak values $V_{iLmax}$, $V_{iLmin}$ which are higher than the desired target values then, the corresponding threshold values $V_{TH1}$, $V_{TH2}$ are decreased accordingly and, vice versa, the threshold values $V_{TH1}$, $V_{TH2}$ are increased when the ripple controller 202 measures peak values which are higher than the desired target values further denoted as $V_{MAX}$ and $V_{MIN}$ respectively. When desired ripple amplitude is, for example, 15% of the desired mean value $V_{REF}$, then $V_{MAX}$ equals $V_{REF}\cdot 1.15$ and $V_{MIN}$ equals $V_{REF}\cdot 0.85$.

Various methods for measuring or estimating the peak values $V_{iLmax}$, $V_{iLmin}$ can be used (or for detecting whether the peak values $V_{iLmax}$, $V_{iLmin}$ match the desired target values or not). First, the two peak values $V_{iLmax}$, $V_{iLmin}$ of the current sense signal $V_{iL}$ may be measured separately using an appropriate peak value measurement circuit. In this case the corresponding threshold values $V_{TH1}$ and $V_{TH2}$ may be controlled separately. However, as the peak level is reached exactly at the time instant when the power transistor $T_L$ is switched on and off (see FIG. 3) and, as a consequence, transient spikes or similar phenomena as well as electromagnetic interferences (EMI) occurring during switching may deteriorate the measurement values obtained.

As an alternative the second threshold value $V_{TH2}$ may be generally set to $-V_{TH1}$ as the ripple should always be symmetrically around the mean value. To avoid the above-mentioned disturbances (EMI, spikes, etc.) which may deteriorate the peak measurement, a different approach is described below. Accordingly, the current sense signal $V_{iL}$ is compared (for the purpose of controlling the thresholds $V_{TH1}$ and $V_{TH2}$ depicted in FIG. 3) with further threshold values $V_{max50}$ and $V_{min50}$ (intermediate threshold values) which are set to a value between the desired mean value $V_{REF}$ and the desired maximum and minimum peak values (target peak values) $V_{MAX}$, $V_{MIN}$. In the example described herein, the further threshold values $V_{max50}$ and $V_{min50}$ are set to 50% of the positive and negative ripple amplitude, respectively, That is:

$$V_{max50}=0.5\cdot(V_{MAX}-V_{REF})+V_{REF}=0.5\cdot(V_{MAX}+V_{REF}), \text{ and} \quad (1)$$

$$V_{min50}=0.5\cdot(V_{MIN}-V_{REF})+V_{REF}=0.5\cdot(V_{MIN}+V_{REF}). \quad (2)$$

However, factors different from 50% are applicable too. When desired ripple amplitude is, for example, 15% of the desired mean value $V_{REF}$, then $V_{max50}$ equals $V_{REF}\cdot 1.075$ and $V_{min50}$ equals $V_{REF}\cdot 0.925$. The mentioned thresholds are illustrated in FIG. 4 to which the further description refers.

Figure 4:
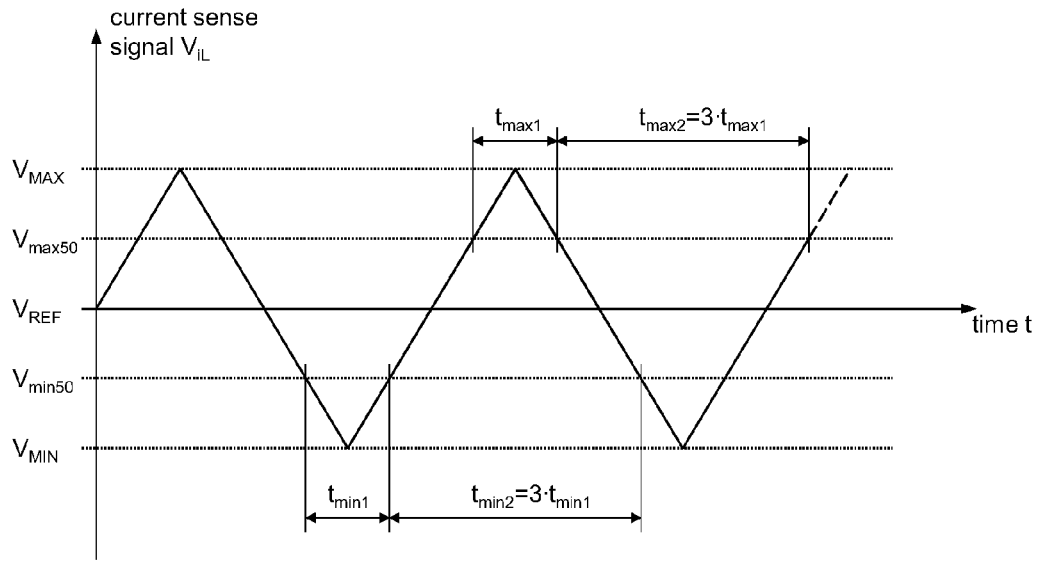
FIG. 4 is a timing diagram illustrating parts of the function of the ripple controller depicted in FIG. 3.

In FIG. 4 the time span $t_{min1}$ during which the current sense signal $V_{iL}$ is lower than the threshold $V_{min50}$ is a third of the time $t_{min2}$ during which the current sense signal $V_{iL}$ is higher than the threshold $V_{min50}$, that is $$t_{min2}/t_{min1}=3. \quad (3)$$

Analogously, 4 the time span $t_{max1}$ during which the current sense signal $V_{iL}$ is higher than the threshold $V_{max50}$ is a third of the time $t_{max2}$ during which the current sense signal $V_{iL}$ is lower than the threshold $V_{max50}$, that is $$t_{max2}/t_{max1}=3. \quad (4)$$

For symmetry reasons $t_{min1}=t_{max1}$ and $t_{min2}=t_{max2}$. When factor 0.5 in equations (1) and (2) is changed to a different value then the ratio 3 in equations (3) and (4) has to be changed accordingly.

The equations (3) and (4) hold true when the actual peak values $V_{iLmin}$, $V_{iLmax}$ of the current sense signal $V_{iL}$ exactly match the desired (target) peak values $V_{MIN}$, $V_{MAX}$. When the peak values $V_{iLmin}$, $V_{iLmax}$ exceed the target peak values $V_{MIN}$, $V_{MAX}$ in magnitude, for example, due to higher (than nominal) propagation delays $t_{Don}$, $t_{Doff}$ (see FIG. 2), then the actual ratios $t_{min2}/t_{min1}$ and $t_{max2}/t_{max1}$ decrease from the nominal value 3 to lower values. Analogously, when the peak values $V_{iLmin}$, $V_{iLmax}$ fall below (in magnitude) the target peak values $V_{MIN}$, $V_{MAX}$, for example, due to lower (than nominal) propagation delays $t_{Don}$, $t_{Doff}$ (see FIG. 2), then the actual ratios $t_{min2}/t_{min1}$ and $t_{max2}/t_{max1}$ increase from the nominal value 3 to higher values. As a result, the peak values $V_{iLmin}$, $V_{iLmax}$ and thus the current ripple amplitude can be stabilized by regulating the ratios $t_{min2}/t_{min1}$ and $t_{max2}/t_{max1}$ to the nominal value (which is 3 in the current example).

Figure 5:
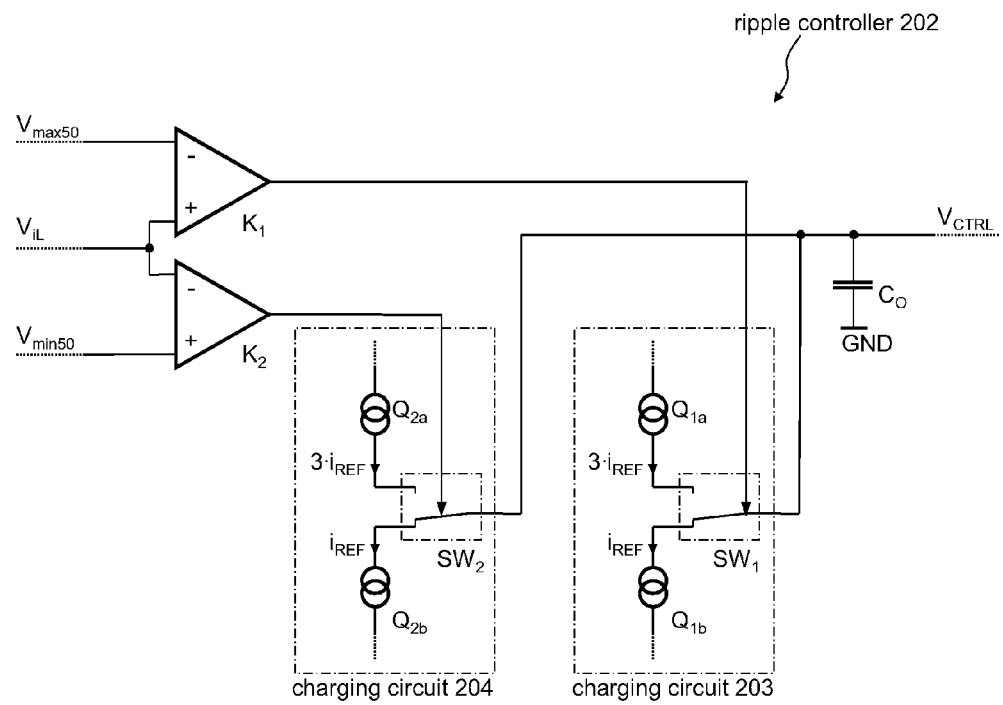
FIG. 5 is a circuit diagram illustrating one exemplary implementation of the ripple controller depicted in FIG. 3.
Figure 5:
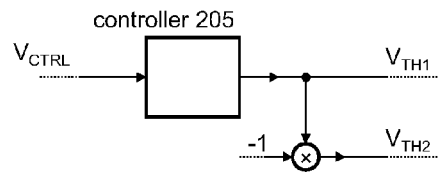

FIG. 5 illustrates an exemplary circuit which may be part of the ripple controller 202 shown in FIG. 3 and which is configured to provide a signal that is indicative of whether the ratios $t_{min2}/t_{min1}$ and $t_{max2}/t_{max1}$ are at their desired nominal value (and thus the ripple current amplitude is at its desired amplitude). Accordingly, the circuit in FIG. 5 includes two comparators $K_1$, $K_2$. Comparator $K_1$ is configured to detect when the current sense signal $V_{iL}$ exceeds the threshold value $V_{max50}$ and comparator $K_2$ is configured to detect when the current sense signal $V_{iL}$ falls below the threshold value $V_{min50}$. A first charging circuit 203 is coupled to the first comparator $K_1$ and a second charging circuit 204 is coupled to the second comparator $K_2$. The charging circuits 203, 204 are both configured to provide a charging or discharging current $3 \cdot i_{REF}$ and $-i_{REF}$, respectively, to one output capacitor $C_O$ dependent on the respective comparator's output signal. Each charging circuit 203, 204 includes a switch $SW_1$ and, respectively, $SW_2$ which is configured to direct the charging/discharging currents $3 \cdot i_{REF}$ and $-i_{REF}$ from the respective current sources $Q_{1a}$, $Q_{1b}$, $Q_{2a}$, $Q_{2b}$ to the output capacitor $C_O$.

When the comparator $K_1$ detects that the current sense signal $V_{iL}$ is higher than the threshold $V_{max50}$ then switch $SW_1$ (of the charging circuit 203) couples the current source $Q_{1a}$ to the output capacitor $C_O$ thus providing a charging current $3 \cdot i_{REF}$ to the capacitor $C_O$. When the comparator $K_1$ detects that the current sense signal $V_{iL}$ is lower than the threshold $V_{max50}$ then switch $SW_1$ (of the charging circuit 203) couples the current source $Q_{1b}$ to the output capacitor $C_O$ thus sinking a discharging current $i_{REF}$ from the capacitor $C_O$. Analogously, when the comparator $K_2$ detects that the current sense signal $V_{iL}$ is lower than the threshold $V_{min50}$ then switch $SW_2$ (of the charging circuit 204) couples the current source $Q_{2a}$ to the output capacitor $C_O$ thus providing a charging current $3 \cdot i_{REF}$ to the capacitor $C_O$. Finally, when the comparator $K_2$ detects that the current sense signal $V_{iL}$ is higher than the threshold $V_{min50}$ then switch $SW_2$ (of the charging circuit 204) couples the current source $Q_{2b}$ to the output capacitor $C_O$ thus sinking a discharging current $i_{REF}$ from the capacitor $C_O$.

It should be noted that charging and discharging periods may be interchanged for both charging circuits 203, 204. This would entail a change of the sign of the capacitor voltage swing in response to a given change of the peak values $V_{iLmax}$, $V_{iLmin}$. The multiplication factor used for the current $i_{REF}$ (i.e., 3 in the present example) must be chosen equal to the nominal ratio $t_{max2}/t_{max1}$ (see equations (3) and (4)), which is 3 in the present example. As in steady state the discharging times $t_{max2}$ and $t_{min2}$ (see FIG. 4) are three times longer than the charging times $t_{max1}$ and $t_{min1}$, and as the discharging currents $i_{REF}$ are only a third of the charging currents $3 \cdot i_{REF}$, the mean voltage $V_{CTRL}$ across the output capacitor is zero (when initialized to 0V).

In many applications, however, the supply voltage is a positive voltage (see supply voltage $V_B$ in the example of FIG. 3) with respect to ground (0V) and thus a steady state capacitor voltage $V_{CTRL}$ of zero volts is not possible. In those cases the capacitor $C_O$ is initialized to a constant positive voltage higher than zero and lower than the supply voltage $V_B$. A stabilized reference voltage $V_{BG}$ may be used to initialize the capacitor voltage $V_{CTRL}$. The stabilized reference voltage $V_{BG}$ may be generated, for example, by a band-gap reference circuit. When the propagation delays $t_{Don}$, $t_{Doff}$ are longer (than nominal), the actual peak values $V_{iLmax}$, $V_{iLmin}$ will rise, and the ratios $t_{max2}/t_{max1}$ and $t_{min2}/t_{min1}$ will decrease correspondingly. As a result, a net charge is added to the capacitor each period of the ripple current and the capacitor voltage $V_{CTRL}$ will rise. Analogously, the capacitor voltage $V_{CTRL}$ will fall, when the propagation delay becomes shorter.

The control voltage $V_{CTRL}$ may be supplied to a controller 205, which may be, e.g., a P controller. The controller 205 reduces the threshold $V_{TH1}$ when the control voltage $V_{CTRL}$ is rising. Thus the controller 205 counteracts the rising control voltage $V_{CTRL}$ and has a stabilizing effect. In such a manner the threshold values $V_{TH1}$ and $V_{TH2}$ are regulated such that the actual peak values $V_{iLmax}$, $V_{iLmin}$ match the desired target values $V_{MAX}$, $V_{MIN}$. The closed loop has an integrating characteristic as the capacitor $C_O$ integrates the error, i.e., the deviation of the actual peak values $V_{iLmax}$, $V_{iLmin}$ from the corresponding desired values $V_{MAX}$, $V_{MIN}$. The controller 205 may include a simple N-MOS-Transistor which receives, as gate voltage, the capacitor voltage $V_{CTRL}$. As such the characteristic of the controller 205 may be describes as $V_{TH1}=-V_{TH2}=k \cdot V_{CTRL}+x$ wherein x represents an offset value (which may be zero) and k is a gain factor which may be heavily non-linear when using a simple MOS-transistor as controlling device. However, due to the integrating characteristic of the output capacitor $C_O$ this non-linearity entails no stability problems.

It should be noted, that the adjustable threshold values $V_{TH1}$ and $V_{TH2}$ are not necessarily represented by physical signals (e.g., voltage signals) which have to be as such supplied to the circuit. These thresholds may also be set indirectly, e.g., by changing the quiescent drain current of a the MOS transistor and thus the respective drain-source-voltage.

Figure 6:
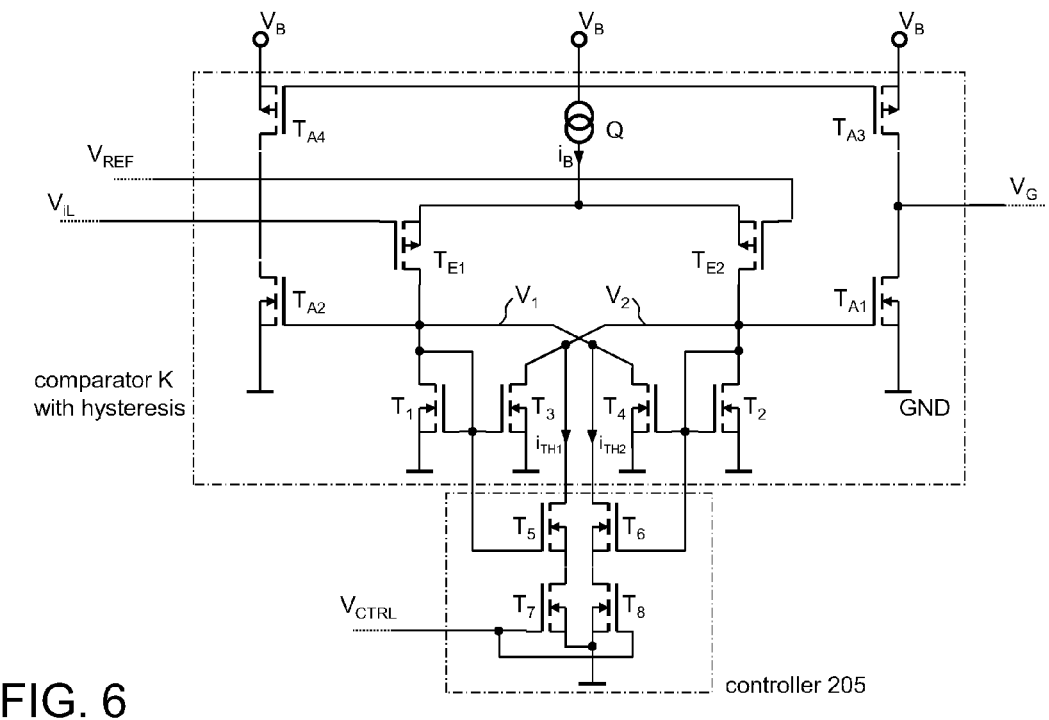
FIG. 6 is a circuit diagram illustrating another an exemplary implementation of the comparator illustrated in FIG. 3.

FIG. 6 illustrates a circuit diagram, illustrating another exemplary implementation of the comparator K with hysteresis illustrated in the example of FIG. 3. The circuit of FIG. 6 includes a high-gain differential amplifier which operates as a comparator. The differential amplifier is formed by the p-channel MOS transistors $T_{E1}$ and $T_{E2}$ and the current source Q. providing a bias current $i_B$ to the MOS transistors $T_{E1}$ and $T_{E2}$. The differential amplifier (operating as a comparator) receives—as input signals at the gate electrodes of the MOS transistors $T_{E1}$ and $T_{E2}$—the reference voltage $V_{REF}$ (representing the desired mean current) and the current measurement signal $V_{iL}$ (representing the LED current $i_L$). The differential amplifier is loaded with the n-channel MOS transistors $T_1$ and $T_2$ whose drain-source current-paths are coupled in series to the drain-source current-paths (main current paths) of the transistors $T_{E1}$ and $T_{E2}$.

The MOS transistors $T_1$ and $T_2$ are coupled to the n-channel MOS transistors $T_3$ and $T_4$, respectively, in such a manner that the transistors $T_1$ and $T_3$ as well as $T_2$ and $T_4$ form two current mirrors. The output transistor $T_3$ and $T_4$ of each one of the two current mirrors is coupled in parallel to the input transistor $T_2$ and $T_1$ of the other current mirror. The circuit nodes coupling the current mirrors and the transistors $T_{E1}$ and $T_{E2}$ may be regarded as (intermediate) output nodes of the differential amplifier providing an intermediate output voltage of $V_1$ and $V_2$, respectively. These output nodes are connected to the gates of the n-channel MOS transistors $T_{A1}$ and $T_{A2}$, respectively, which form a symmetric output stage, wherein each transistor $T_{A1}$ and $T_{A2}$ is coupled in series with a further transistor $T_{A3}$ and $T_{A4}$ respectively. Accordingly, transistor $T_{A3}$ and $T_{A4}$ are connected between the drains of transistors $T_{A1}$ and $T_{A2}$, respectively, and a supply potential. The common circuit node of transistors $T_{A1}$ and $T_{A3}$ is the comparator output $V_G$ (see also FIG. 3).

In the example of FIG. 6 the comparator threshold values are $V_{REF}+V_{TH1}$ and $V_{REF}-V_{TH2}$ wherein $V_{TH1}=V_{TH2}=V_{TH}$. To illustrate the function of the comparator firstly, only the comparator K is considered without the controller 205 (transistors $T_5$ to $T_7$ further discussed below). Assuming that the current measurement signal has reached $V_{REF}-V_{TH}$, the output stage is active ($V_G$ is at a high level), current mirror output transistor $T_4$ transistor sinks some current provided by transistor $T_{E1}$, while current mirror output transistor $T_3$ transistor now sinks less current (provided by transistor $T_{E2}$) as the voltage $V_1$ (gate voltage of transistor $T_3$) is lower. Due to the active output stage the load current $i_L$ and thus the current sense signal $V_{iL}$ increases until the upper threshold $V_{REF}+V_{TH}$ is reached. At this moment, the transistor $T_3$ becomes conductive thus triggering a decrease in the voltage $V_2$ what entails a switch-off of transistor $T_4$ and a change in state of the output voltage $V_G$ (which switches to a low level). As a consequence the current sense signal $V_{iL}$ again decreases until the threshold $V_{REF}-V_{TH}$ is reached. At this point transistor $T_4$ becomes again conductive and the cycle starts over (see also FIG. 2).

The controller circuit 205 (being a part of the ripple controller 202, see FIGS. 3 and 5) includes the transistors $T_4$ and $T_6$ which can be connected in parallel to the transistors $T_3$ and $T_4$, respectively, thus—when connected in parallel—effectively reducing the on-resistance of transistors $T_3$ and $T_4$. The parallel circuit (transistor $T_3$, $T_5$ and $T_4$, $T_6$) may be accomplished by driving the transistors $T_7$ and $T_8$ (which are connected between the transistors $T_5$ and $T_6$, respectively, and ground GND) to a conductive state. By varying the gate voltage of the transistors $T_7$ and $T_8$ the amount of additional current $i_{TH\,1}$ and $i_{TH2}$ sunk by transistors $T_5$ and $T_6$ may be tuned. However, the threshold value $V_{TH}$ mentioned above depends on the currents $i_{TH1}$ and $i_{TH2}$ and, as a consequence, the threshold voltages $V_{REF}+V_{TH}$ and $V_{REF}-V_{TH}$ may be tuned by varying the currents $i_{TH1}$ and $i_{TH2}$ via the controller 205 which is responsive to the deviation between the actual peak values $V_{iLmin}$, $V_{iLmax}$ from the desired peak values $V_{MIN}$ and $V_{MAX}$, respectively.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Particularly, MOS transistors may be replaced by corresponding bipolar junction transistors and circuits using n-channel or npn-type transistors may be substituted by their complementary p-channel or pnp-type equivalents. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A LED controller circuit to be coupled to a LED device, the LED controller circuit comprising:
    a first circuit node to receive a current sense signal representative of a load current supplied to the LED device;
    a comparator coupled to receive the current sense signal and configured to compare the current sense signal with an upper threshold value and a lower threshold value;
    a load transistor to be coupled to the LED device and configured to provide the load current to the LED device in accordance with a comparator output signal provided by the comparator; and
    a ripple control circuit configured to adjust the upper threshold value and the lower threshold value based on a comparison of the current sense signal and a first intermediate threshold value.

2. The LED controller circuit of claim 1, wherein the ripple control circuit is configured to detect peak values of the current sense signal and to compare the detected peak values with corresponding desired peak values, wherein the upper threshold value and the lower threshold value are adjusted dependent on the comparing such that, in steady state, actual peak values more closely match corresponding desired peak values.

3. The LED controller circuit of claim 1, wherein the ripple control circuit is configured to compare the current sense signal with the first intermediate threshold value, and wherein the upper threshold value and the lower threshold value are adjusted dependent on a ratio between a first and a second time interval,
    the first time interval being the time interval during which the current sense signal is below the first intermediate threshold value, and
    the second time interval being the time interval during which the current sense signal is above first intermediate threshold value.

4. The LED controller circuit of claim 3, wherein the ripple control circuit further includes:
    a comparator configured to detect whether the current sense signal is above or below the first intermediate threshold value,
    an output capacitor, and
    a charging circuit configured to charge the capacitor during the first time interval and to discharge the capacitor during the second time interval or vice versa, wherein the ratio between the charging and discharging current corresponds to a nominal ratio between the first and second time intervals.

5. The LED controller circuit of claim 1, wherein the ripple control circuit is configured to compare the current sense signal with a second intermediate threshold value, and wherein the upper threshold value and the lower threshold value are adjusted dependent on a ratio between a third and a fourth time interval,
    the third time interval being the time interval during which the current sense signal is above the second intermediate threshold value, and the fourth time interval being the time interval during which the current sense signal is below the second intermediate threshold value.

6. The LED controller circuit of claim 1, wherein the ripple control circuit is configured to compare the current sense signal with the first and a second intermediate threshold value, and wherein the upper threshold value and the lower threshold value are adapted dependent on a first ratio between a first and a second time interval and a second ratio between a third and a fourth time interval,
the first time interval being the time interval during which the current sense signal is below the first intermediate threshold value,
the second time interval being the time interval during which the current sense signal is above first intermediate threshold value,
the third time interval being the time interval during which the current sense signal is above the second intermediate threshold value, and
the fourth time interval being the time interval during which the current sense signal is below the second intermediate threshold value.

7. The LED controller circuit of claim 6, wherein the first and the second ratios are at a nominal value when actual peak values of the load current match corresponding desired values.

8. The LED controller circuit of claim 7, wherein the ripple control circuit further includes:
a first comparator configured to detect whether the current sense signal is above or below the first intermediate threshold value,
a second comparator configured to detect whether the current sense signal is above or below the first intermediate threshold value,
an output capacitor, and
a first charging circuit configured to charge the capacitor during the first time interval and to discharge the capacitor during the second time interval or vice versa,
a second charging circuit configured to charge the capacitor during the third time interval and to discharge the capacitor during the fourth time interval or vice versa,
wherein the ratio between the charging and discharging current corresponds to a nominal ratio between the first and second time intervals.

9. The LED controller circuit of claim 8, wherein the ripple control circuit further includes a controller circuit responsive to a voltage drop across the output capacitor, the ripple control circuit configured to provide updated upper and lower threshold values, such that, in steady state, the actual peak values of the current sense signal more closely match the corresponding desired peak values.

10. A circuit arrangement comprising:
an LED device including an LED;
an inductor coupled in series to the LED of the LED device;
an sense resistor coupled in series to the LED of the LED device and configured to provide a current sense signal representing a load current flowing through the LED;
a free-wheeling diode coupled to the LED device;
a comparator coupled to receive the current sense signal and configured to compare the current sense signal with an upper threshold value and a lower threshold value;
a load transistor coupled to the LED device and configured to provide the load current to the LED device in accordance with a comparator output signal provided by the comparator; and
a ripple control circuit configured to adjust the upper threshold value and the lower threshold value based on a comparison of the current sense signal and a first intermediate threshold value.

11. The circuit arrangement of claim 10, wherein the LED device comprises a plurality of LEDs.

12. The circuit arrangement of claim 11, wherein the plurality of LEDs are coupled in series.

13. The circuit arrangement of claim 10, wherein the load transistor is configured to provide current to the inductor when the current sense signal exceeds the upper threshold and to be switched off then the current sense signal falls below the lower threshold.

14. The circuit arrangement of claim 10 wherein the comparator is formed by a high gain differential amplifier having a first and a second input transistor and a current source providing a bias current, wherein the upper and the lower threshold values are tuned by providing or sinking current to or from a main current path of the first and second input transistor.

15. A method for controlling an LED device, the method comprising:
generating a current sense signal representative of a load current flowing through the LED device;
comparing the current sense signal with an upper threshold value and a lower threshold value;
providing current to the LED device via an inductor coupled in series with the LED device when the current sense signal exceeds the upper threshold, wherein a load current loop is closed over a free-wheeling diode when no current is provided to the LED device while the current sense signal is below the lower threshold; and
adjusting the upper threshold and the lower threshold dependent on the current sense signal based on a comparison of the current sense signal and an intermediate threshold such that peak values of the current sense signal more closely match corresponding desired peak values.

16. The method of claim 15, further comprising detecting peak values of the current sense signal and comparing the detected peak values with corresponding desired peak values, wherein the upper threshold value and the lower threshold value are adjusted dependent on the comparing such that, in steady state, actual peak values more closely match corresponding desired peak values.

17. The method of claim 15, wherein the comparing comprises comparing the current sense signal with a first intermediate threshold value, and wherein the upper threshold value and the lower threshold value are adjusted dependent on a ratio between a first time interval and a second time interval, the first time interval being the time interval during which the current sense signal is below the first intermediate threshold value and the second time interval being the time interval during which the current sense signal is above first intermediate threshold value.

18. The method of claim 15, wherein the comparing further comprises comparing the current sense signal with a second intermediate threshold value, and wherein the upper threshold value and the lower threshold value are adjusted dependent on a ratio between a third and a fourth time interval, the third time interval being the time interval during which the current sense signal is above the second intermediate threshold value and the fourth time interval being the time interval during which the current sense signal is below the second intermediate threshold value.

19. The method of claim 15, wherein the comparing comprises comparing the current sense signal with a first intermediate threshold value and a second intermediate threshold value, and wherein the upper threshold value and the lower threshold value are adapted dependent on a first ratio between a first time interval and a second time interval and a second ratio between a third and a fourth time interval,
  the first time interval being the time interval during which the current sense signal is below the first intermediate threshold value,
  the second time interval being the time interval during which the current sense signal is above first intermediate threshold value,
  the third time interval being the time interval during which the current sense signal is above the second intermediate threshold value, and
  the fourth time interval being the time interval during which the current sense signal is below the second intermediate threshold value.

20. The method of claim 19, wherein the first and the second ratios are at a nominal value when actual peak values of the load current match corresponding desired values.

21. A LED controller circuit to be coupled to a LED device, the LED controller circuit comprising:
  a first circuit node to receive a current sense signal representative of a load current supplied to the LED device;
  a comparator coupled to receive the current sense signal and configured to compare the current sense signal with an upper threshold value and a lower threshold value;
  a load transistor to be coupled to the LED device and configured to provide the load current to the LED device in accordance with a comparator output signal provided by the comparator; and
  a ripple control circuit configured to adjust the upper threshold value and the lower threshold value in response to the current sense signal, and to compare the current sense signal with a first intermediate threshold value, and
  wherein the upper threshold value and the lower threshold value are adjusted dependent on a ratio between a first and a second time interval,
  the first time interval being the time interval during which the current sense signal is below the first intermediate threshold value, and
  the second time interval being the time interval during which the current sense signal is above first intermediate threshold value.

22. A method for controlling an LED device, the method comprising:
  generating a current sense signal representative of a load current flowing through the LED device;
  comparing the current sense signal with an upper threshold value and a lower threshold value;
  providing current to the LED device via an inductor coupled in series with the LED device when the current sense signal exceeds the upper threshold, wherein a load current loop is closed over a free-wheeling diode when no current is provided to the LED device while the current sense signal is below the lower threshold; and
  adjusting the upper threshold and the lower threshold dependent on the current sense signal such that peak values of the current sense signal more closely match corresponding desired peak values,
  wherein the comparing comprises comparing the current sense signal with a first intermediate threshold value, and wherein the upper threshold value and the lower threshold value are adjusted dependent on a ratio between a first time interval and a second time interval, the first time interval being the time interval during which the current sense signal is below the first intermediate threshold value and the second time interval being the time interval during which the current sense signal is above first intermediate threshold value.

* * * * *